(12) United States Patent
Peljto (10) Patent No.: US 7,523,075 B2
(45) Date of Patent: Apr. 21, 2009

(54) STARTUP COST MODEL USING TIME COUNTER

(75) Inventor: Haso Peljto, Brooklyn Park, MN (US)

(73) Assignee: Siemens Energy, Inc., Orlando, FL (US)

( * ) Notice: Subject to any disclaimer, the term of this patent is extended or adjusted under 35 U.S.C. 154(b) by 672 days.

(21) Appl. No.: 11/035,135

(22) Filed: Jan. 13, 2005

(65) Prior Publication Data

US 2005/0222826 A1    Oct. 6, 2005

Related U.S. Application Data

(60) Provisional application No. 60/537,055, filed on Jan. 16, 2004.

(51) Int. Cl.
*G06F 17/00* (2006.01)
*G01R 11/56* (2006.01)
*G01R 21/133* (2006.01)

(52) U.S. Cl. .......................................... 705/412; 703/2

(58) Field of Classification Search ............... 705/412
See application file for complete search history.

(56) References Cited

U.S. PATENT DOCUMENTS 4,262,636 A * 4/1981 Augsburger .............. 122/406.5
4,910,421 A * 3/1990 VanSchaick et al. ...... 310/68 D

OTHER PUBLICATIONS

Knutson, Kent; Seiple, Chris; "Competitive Power Markets Put Capacity at Risk" Public Utilities Fortnightly, v135, n4, pp. 16-17 Feb. 15, 1997.*

* cited by examiner

*Primary Examiner*—John W Hayes
*Assistant Examiner*—Allen J Jung

(57) ABSTRACT

A system and method for generator startup cost modeling using a time counter are described herein. A method and system according to the invention may include assigning a binary value to one or more time segment variables each associated with an increment of the time counter wherein the sum of the one or more time segment variables is greater than or equal to a binary startup variable. The method and system may also assign a value to one or more startup cost variables associated with each of the one or more time segment variables. The system and method may then determine the startup cost of a shutdown time by summing the products of each time segment variable and associated startup cost variable. In another aspect the method and system may entail a sum of products of each binary time segment variable and time increment being less than or equal to a time-off variable.

17 Claims, 5 Drawing Sheets

STARTUP COST MODEL USING TIME COUNTER

CROSS REFERENCE TO RELATED APPLICATIONS

This application claims the benefit of U.S. Provisional Patent Application entitled "Startup Cost Model Using Time Counter" filed Jan. 16, 2004, Ser. No. 60/537,055 which is hereby incorporated by reference in its entirety.

FIELD OF THE INVENTION

The present invention relates in general to electrical generators modeling, and, more particularly, to a method and system for modeling the generator startup cost using a counter.

BACKGROUND OF THE INVENTION

A generator converts mechanical energy to electrical energy. An Alternating Current (AC) generator comprises two primary components: a rotor and a stator. The rotor is made up of electrically conductive coils that forms a rotor winding. The stator is also made up of coils that form a stator winding. Mechanical energy turns the rotor relative to the stator while a field current is passed through the rotor winding to induce a voltage on the stator winding. The induced power in the stator winding is supplied to loads that are powered by the generator. The electrical energy produced by the generator should be equal to the amount of electrical energy consumed by the loads.

Power plants often have multiple generators to supply power for various loads of a community. Examples of loads within the community may include lighting, heating, cooling, appliances, and other machinery. The community's demand for power often fluctuates throughout the day and based on the time of year. During a daily cycle the demand may peak during the evening hours and fall at night when most people are asleep. The yearly demand cycle for power may peak during summer months due to the increased use of air conditioning. The power plant needs to be able to increase and decrease the amount of energy supplied. The power plant may shut down one or more generators, thereby reducing the amount of electrical energy produced. During periods when the community has an increased demand, the power plant may restart generators that have been off-line to supply the additional energy demand of the community.

In addition to shutting down generators to meet the current load of the community, generators must also be shut down for routine maintenance and repair. For example, some generators may need to be shut down after periods of high use to prevent overheating and destruction of the various parts of the generator. The time and costs for shutting down and starting a generator may vary depending on the type of generator and the size of the generator. For example, a large generator powered by nuclear fuel may require considerably greater cost to shut down and start compared to a smaller diesel fuel, substation generator. In addition, some generators are designed to be very efficient at their optimal running speed, but have very slow ramp-up rates and require incremental warmth-dependent startup which adds to the startup costs. Other factors that can affect shutdown time and costs may include equipment availability, for example boilers, steam turbine generators, combustion turbine, chillers, powerhouse auxiliaries, and air compressors. Other factors that may affect startup and shutdown may include the current electricity prices, generator fuel costs, and costs for ancillary components such as air and chilled water. The amount of pollutants produced by the power plant during specific periods of time may also affect the decision to shut down and start specific generators.

The complexity and huge quantity of factors can make determining the startup cost of generators a complicated process. Accordingly, an efficient and effective system and method to model and optimize the startup costs associated with generators is needed. In view of the foregoing, it would be desirable to provide systems and methods that can determine, model and optimize the startup costs of a generator.

SUMMARY OF THE INVENTION

It is, therefore, an object of the present invention to provide systems and methods that model and minimize the startup costs of a generator based on the elapsed time following a prior shutdown. These and other objects of the invention are provided in accordance with the principles of the present invention. A method according to exemplary embodiments of the invention may include assigning a binary value to one or more time segment variables each associated with an increment of the time counter wherein the sum of the one or more time segment variables is greater than or equal to a binary startup variable. The method may also include assigning a value to one or more startup costs variables associated with each of the one or more time segment variables. The method may then determine the startup cost of a shutdown time by summing the products of each time segment variable and associated startup cost variable.

In another aspect of the invention, the method may entail computing a sum of the products of each binary time segment variable and time increment being less than or equal to a time-off variable. In another aspect of the invention the time-off variable can be less than or equal to a market time horizon. In an alternate aspect of the invention, the time segment variable associated to the current increment of time counter may be assigned a one-unit value when the generator starts. In yet another aspect, the time segment variable associated with a first increment of the time counter may be assigned a one-unit value if the time counter is stopped prior to the first increment. In yet an additional aspect, the time segment variable associated with a last increment of the time counter may be assigned a one-unit value if the time counter reaches a final count.

A system according to exemplary embodiments of the present invention may include a means for assigning a binary value to one or more time segment variables each associated with an increment of the time counter wherein the sum of the one or more time segment variables is greater than or equal to a binary startup variable. The system may include a means for assigning a value to one or more startup cost variables associated with each of the one or more time segment variables. The system may also include a means for determining the startup cost of a shutdown time by summing the products of each time segment variable and associated startup cost variable.

Additionally the system may entail computing a sum of the products of each binary time segment variable and time increment being less than or equal to a time-off variable. Other aspects of the invention as described in the exemplary method of the invention may be implemented in an exemplary system of the invention. The exemplary aspects of the invention may be implemented through hardware or software.

BRIEF DESCRIPTION OF THE DRAWINGS

The above and other objects and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
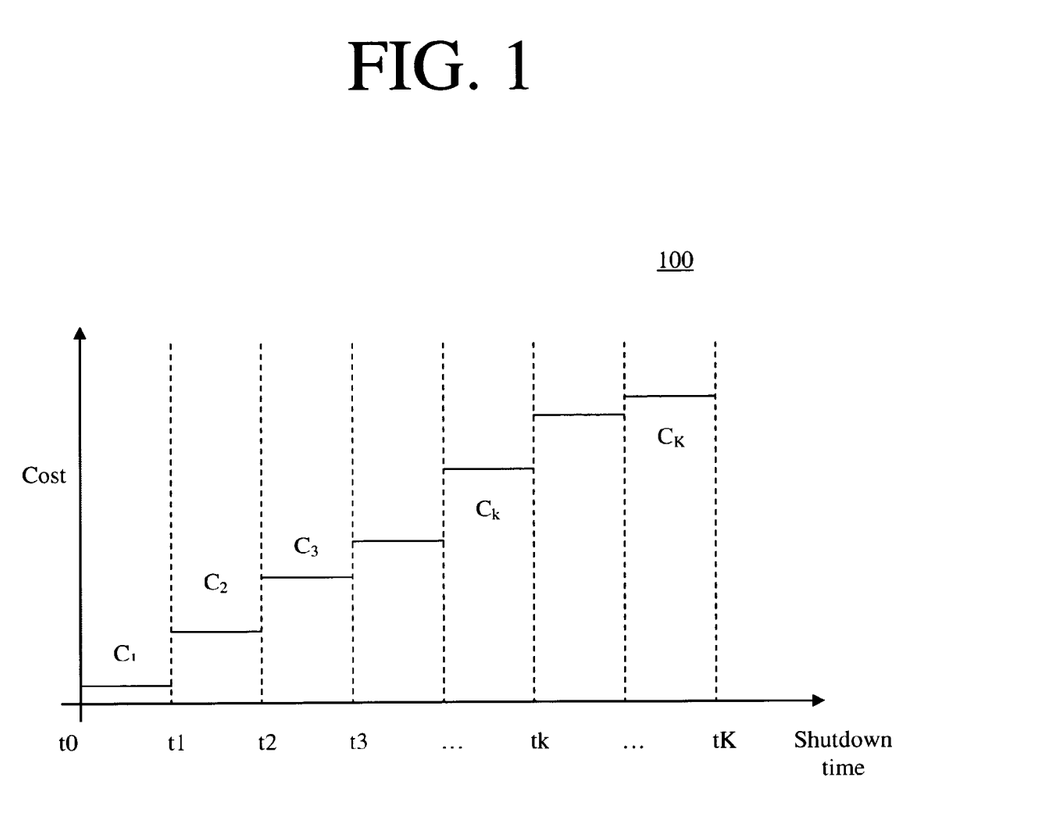
FIG. 1 is a sample startup cost function for a generator.

FIG. 1 is an exemplary startup cost function for a generator. The startup cost for a generator can be estimated based on the time elapsed between the last shutdown time and the current shutdown time. As shown in the graph of FIG. 1, the abscissa represents the time elapsed from the previous shutdown. The mantissa represents the cost of starting the generator based on shutting down the generator at time t. The startup cost can be approximated as a stepwise increasing function. As time from the previous shutdown elapses, the cost of starting up the generator increases. As previously discussed, several factors contribute to this increase in startup cost, for example, increased repair, additional cooling time, and additional fuel cost due to slower ramp-down and ramp-up times. Each step of the startup cost function represents the cost associated with shutting down the generator at each specific time interval. For example, the startup cost associated with shutting down the generator prior to time $t_2$ but after $t_1$ is $C_2$. $C_2$ represents the value for the startup costs associated with the time segment between $t_1$ and $t_2$. Similarly, the cost associated with shutting down the generator at or just before times $t_1, t_2, \ldots t_k$ are equal to startup costs $C_1, C_2, \ldots C_k$ respectively. The cost of starting up the generator continues to increase until time $t_K$. After time $t_K$ the cost remains a constant $C_K$ until the generator is shut down. Once the generator is shut down, the time count is restarted and the startup function starts again from the origin.

The present invention provides a model and constraints that allow the determination of the startup costs of the generator based on a shutdown time. The values used within the model can be equivalent to the values calculated by the startup cost function as shown in FIG. 1. A counter provides the time frame for the model. The counter is initiated at the point in time when the generator is started. The counter provides increments of time represented in FIG. 1 as $t_1, t_2, \ldots t_k$. The increments of time can be represented in units of, for example, minutes, hours, or days. The units may be based on the scale of the model and/or the characteristics of the generator being modeled. The time of the counter is broken down into segments. Each segment of time may be represented by a time segment variable $S^t k$. For example, the time segment between time $t_1$ and $t_2$ is $S^t_1$. $S^t_1$ represents the time segment between $t_1$ and $t_2$. The time segment variable can be a binary variable with the following values:

Binary Constraints $$S^t_k = \{0;1\}$$

The time segment variables associated with time segments in which the generator does not shut down may be set equal to a value of zero. The time segment variable associated with the time segment when the generator shuts down may be set equal to a value of one.

For each time segment represented by a time segment variable $S^t_k$ a startup cost variable $C_k$ represents the cost associated with starting the generator based on shutting down the generator during the time segment. As shown in FIG. 1 and previously discussed, the startup costs increase until the time segment represented by $S^t_K$ is reached. After time $t_K$ the cost remains constant and is equal to the startup cost variable $C_K$ until the generator is shut down. Once the generator is shut down the model is restarted to calculate the next series of startup costs.

The startup status of the generator is represented by a startup variable $z^t$. The startup variable can be assigned a binary value. The startup variable $z^t$ is set equal to one when the generator is in the process of starting up. During all other stages the startup variable $z^t$ is equal to zero. A startup constraint of the exemplary embodiment is as follows:

$$S^t_1 + S^t_2 + \ldots + S^t_k + \ldots + S^t_K \geq z^t$$

The sum of all the time segments is equal to or greater than the startup variable $Z^t$. If the generator is currently operating and has not shut down then all of the time segment variables will be equal to zero. The startup constraint in this case then requires that the startup variable $z^t$ also be equal to zero. The startup constraint prevents modeling a non-realizable physical situation, such as the generator going into a, startup mode if the generator has not shut down.

The amount of time the generator has spends in an off mode (i.e., being shut down) is represented by a time-off variable $t_{OFF}$. The time-off variable $t_{OFF}$ can be assigned a numeric value based on a counter that is initiated when the generator is shut down and stopped when the generator is restarted. A shutdown time counter constraint of the exemplary embodiment is as follows:

$$t_{OFF} \leq t_1 * S^t_1 + t_2 * S^t_2 + \ldots + t_{K-1} * S^t_{K-1} + (1-z^t) * T$$

The sum of all the products of each respective time segment and time increment is equal to or less than the time-off variable $t_{OFF}$. To cover the case when the shutdown has not happened in the last $t_k$ time interval, the last segment variable $S^t_k$ is not included in the shutdown time counter constraint. A time horizon, as may be used by the model for modeling generator startup costs in a given market, is represented in the shutdown time counter constraint as T. If the generator does not startup in time interval t, the shutdown time counter constraint requires that $t_{OFF} \leq T$. Therefore a present value of the generator shutdown time, as indicated by time-off variable $t_{OFF}$ would be less than or equal to the time horizon T of the model. As will be appreciated by one skilled in the art, the shutdown constraint prevents modeling another non-realizable situation, such as the generator being shutdown longer than the time horizon T used by the model.

The model determines the startup cost as follows:

$$\text{Minimize Startup Cost} = \min\{S^t_1 * C_1 + S^t_2 * C_2 \ldots + S^t_i * C_i + \ldots + S^t_k * C_k\}$$

wherein $S^t_i$ represents a time segment variable for an ith time segment and $C_i$ represents the startup cost associated with said ith time segment, and wherein i is a positive integer number.

The minimization operator selects the first segment if there are no other constraints imposed. The above constraints provide for a determination of the startup costs based on the time from the previous startup to the time of the current shutdown. The startup constraint forces all time segment variables $S^t_k$ to be equal to zero if the generator does not startup at time interval t. In this case $z^t=0$ and therefore all $S^t_k=0$. If the generator is started at time interval t then $z^t=1$ and the startup constraints allow at least one of the time segment variables to be equal to one. The minimization operator then selects only one of the products of the time segment variable and respective startup cost variable. In all possible cases the exemplary embodiment provides the appropriate model behavior and allows for the determination of the generator startup costs.

In the exemplary embodiment the time segment variables and the startup variable are binary values; however, the present invention is not limited to the time segment variables and startup variable being binary values. The time segment variable and startup variable may be other values as would be appreciated by one of ordinary skill in the art. For example, the time segment variable and/or startup variable can be a numeric value or other symbolic value. In this example an additional process may be incorporated to scale, round, or truncate the values. The model may then use variables in a similar fashion as previously described in the exemplary embodiment.

Figure 2:
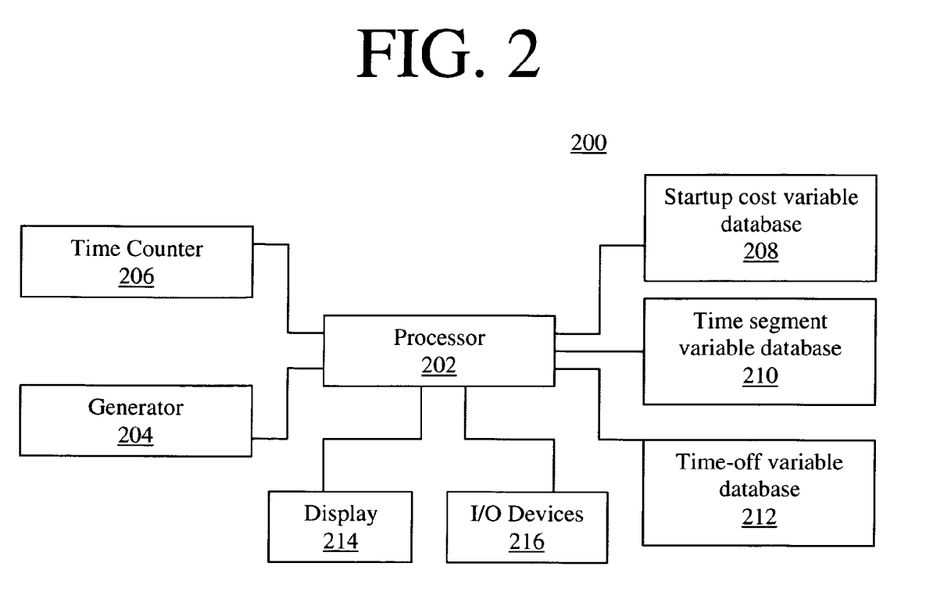
FIG. 2 is a schematic diagram of an exemplary system constructed in accordance with the principles of the present invention for providing a model and optimization of startup costs for a generator.

FIG. 2 is a schematic diagram of an exemplary system 200 constructed in accordance with the principles of the present invention for providing a model and optimization of startup costs for a generator. The exemplary system 200 has a processor 202, a generator output 206, and a time counter 206. The processor 202 loads and stores the variables of the system in three databases. The startup cost variable database 208 stores the startup cost variables. The time segment variables and time-off variables are stored, respectively, in the time segment variable database 210 and time-off variable database 212. Although the exemplary system 200 depicts the three databases as separate databases, it should be apparent that the three databases can be combined into a single storage database. The exemplary system 200 communicates to a user with a display 214 and various input/output devices. The exemplary system 200 is not limited to the components shown in FIG. 2. A variety of other devices may also be incorporated. For example, an additional database can be used to store previous variables from prior cycles or other variables that summarize prior generator history.

The exemplary system 200 sets all time segment variables to zero. The exemplary system 200 is initiated when the generator output 206 signals the processor 202 that the generator has initiated startup. When the generator initiates startup, the processor initiates the time counter 206. The startup variable is set equal to one during the generator startup. The startup variable may be stored within the processor 202 or a database connected to the processor 202. The startup variable may also be signaled to the processor 202 from the generator output 204.

When the generator initiates shutdown, the processor 202 sets the time segment variable associated with the current time segment of the time counter equal to a value of one. The processor 202 then calculates the minimize startup cost which selects the products of time segment variable equal to one and the respective startup cost for that time segment variable. The processor may also routinely or continuously ensure that the startup constraint and shutdown time counter constraint are accurate.

Architecturally, aspects of the invention can be located on a server, workstation, minicomputer, or mainframe. The processor may be a part of a general purpose computer with the databases stored in memory associated with the general purpose computer. One or more input and/or output (I/O) devices (or peripherals) may be communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connection to enable appropriate communications among the components of a network. The systems and method may be hardwired with the computer to allow it to perform various aspects of the invention.

The systems and methods may also be incorporated in software used with a computer. The software may be stored or loaded in the memory and may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services. The system and method may also include a Graphic User Interface (GUI) to allow the user to edit variables or the various constraints. The GUI may provide a user-friendly interface which allows a user to enter model data and calculate startup costs for experiential data.

Figure 3:
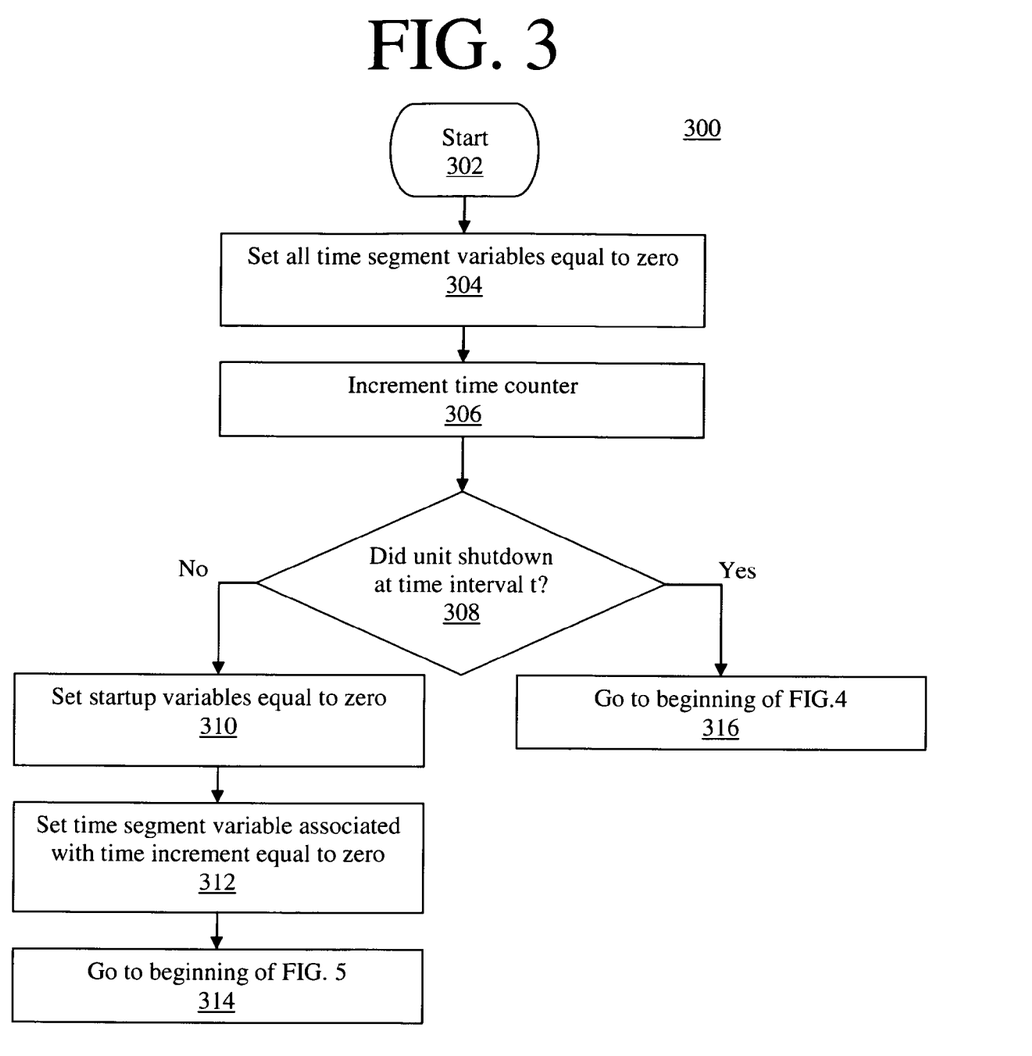
FIG. 3 is a flow chart illustrating an initial exemplary routine 300 for modeling and determining the cost associated with starting a generator based on a shutdown time in accordance with the principles of the present invention.

FIG. 3 is a flow chart illustrating an initial exemplary routine for modeling and determining the cost associated with starting a generator based on, a shutdown time in accordance with the principles of the present invention. According to the initial exemplary embodiment 300, the method is initiated (block 302) when the processor receives the signal that the generator has started. The method may set all time segment variables equal to a zero value (block 304). The time counter begins and increments for the first time increment (block 306). The method checks to see if the generator has shut down during the first time increment (block 308).

If the generator has not shut down ("No" branch of block 308), the method may set the startup variable equal to zero (block 310). The method may again set the time segment variable associated with the first time segment, $S^t_1$, equal to zero (block 312) or verify that the first time segment continues to equal zero. The method advances to the process disclosed in FIG. 5 (block 314) and described later herein. If the generator has begun shutdown ("Yes" branch of block 308), the method advances to the process disclosed in FIG. 4 (block 316).

Figure 4:
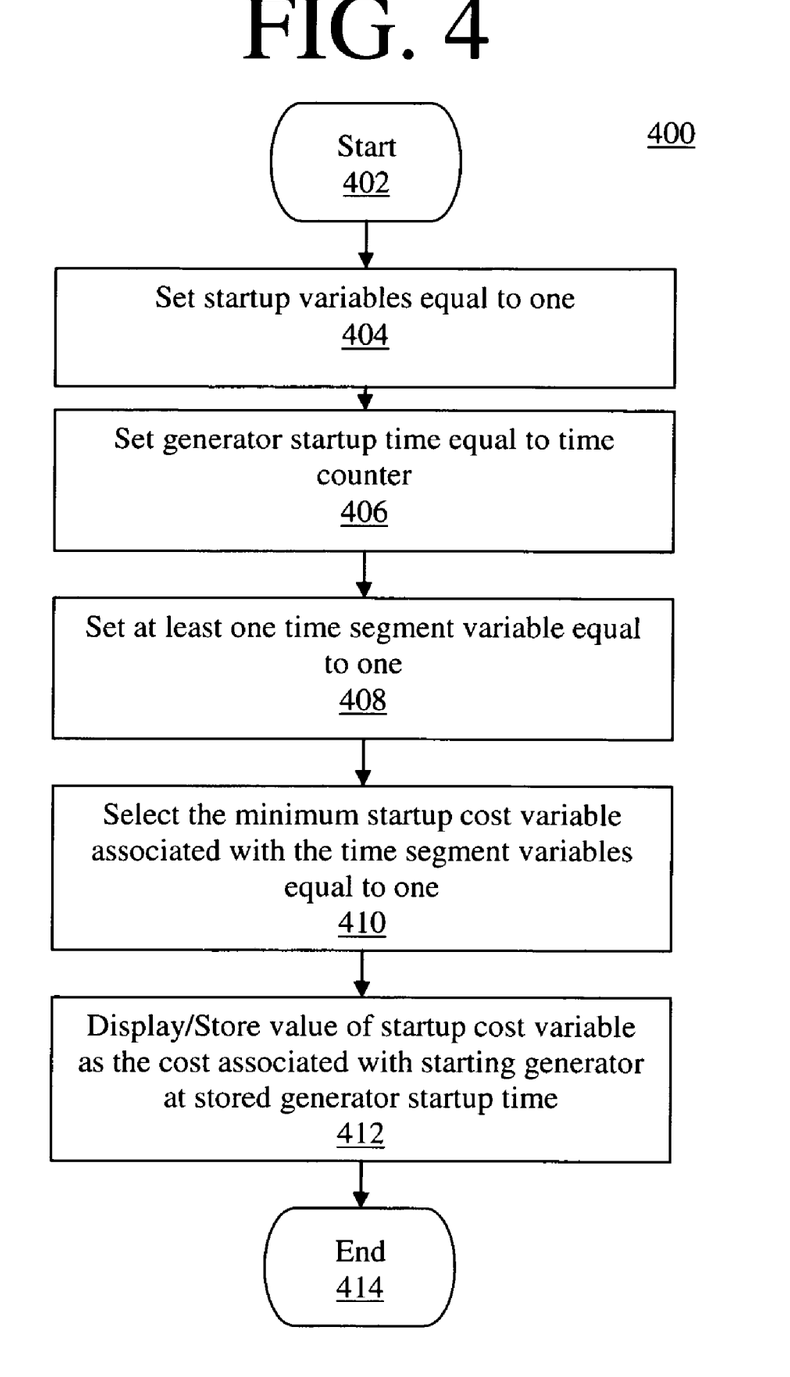
FIG. 4 is a flow chart illustrating a first exemplary aspect 400 of the routine for modeling and minimizing the cost associated with starting a generator based on a shutdown time in accordance with the principles of the present invention.

FIG. 4 is a flow chart illustrating an exemplary first aspect 400 of the routine for modeling and minimizing the cost associated with starting a generator based on a shutdown time in accordance with the principles of the present invention. According to the first exemplary aspect 400, when the generator shuts down or begins the shutdown process, the method associated with the first exemplary aspect 400 is initiated (block 402). The method may set the startup variable equal to a value of one (block 404). The method may set the generator startup time equal to the current value of the time counter (block 406). The method may also set at least one of the time segment variables equal to a value of one (block 408). The method may then determine the minimum startup cost variable associated with the time segment variables that are equal to one (block 410). The processor may use the minimized startup cost equation as previously described or a similar logic expression to determine the minimum startup cost for the current shutdown time. The method can display and/or store the value of the minimum startup cost as the cost associated with starting the generator based on the prior startup time and current shutdown time. The minimum startup cost can be used by the user or other systems and methods to optimize the operations of the generator. The first exemplary aspect is completed and ends the first cycle of operation (block 414). The system may then standby for further instructions or restart operation for the next operation cycle (block 302 of FIG. 3).

Figure 5:
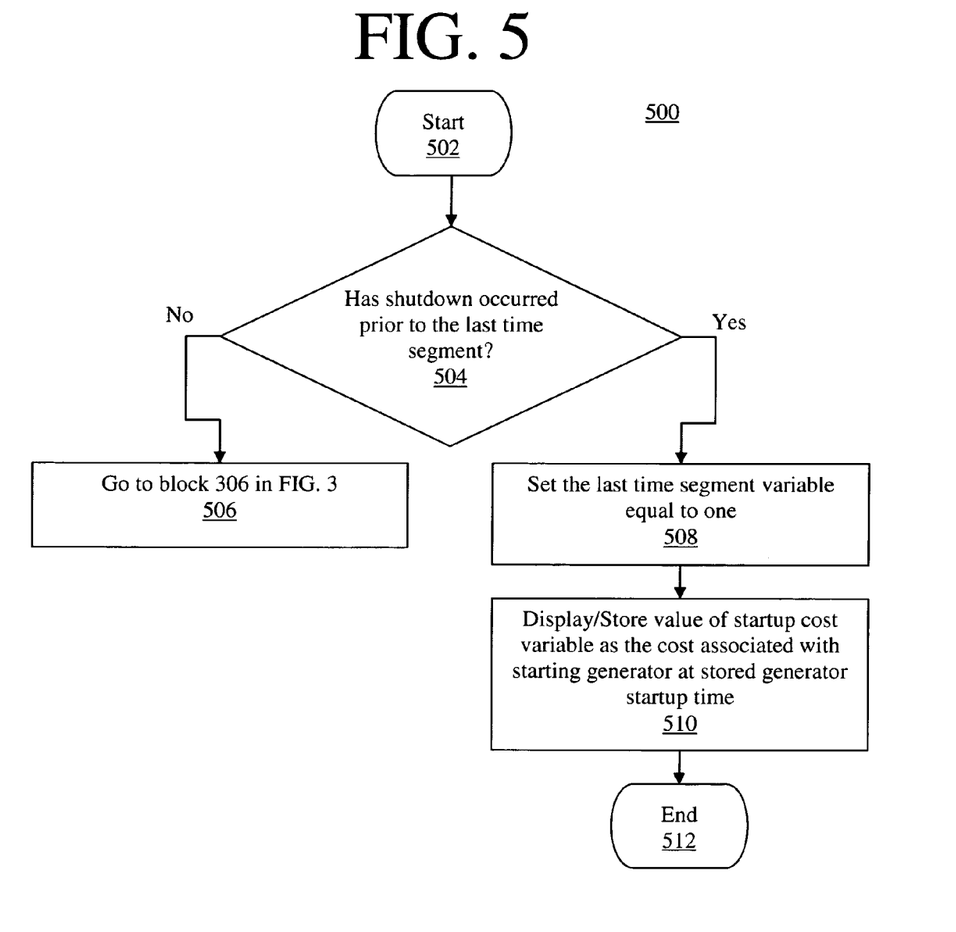
FIG. 5 is a flow chart illustrating a second exemplary 500 aspect of the routine for modeling and minimizing the cost associated with starting a generator based on a shutdown time in accordance with the principles of the present invention.

FIG. 5 is a flow chart illustrating a second exemplary aspect 500 of the routine for modeling and minimizing the cost associated with starting a generator based on a shutdown time in accordance with the principles of the present invention. As previously discussed, if the generator has not shut down ("No" branch of block 308), the method advances to the start (block 502) of the second exemplary aspect of the routine 500. The method determines if the shutdown occurred prior to the last time segment increment (block 504). If the generator has not shut down prior to the last time segment ("No" branch of block 504), the method returns to block 306 in FIG. 3 and continues the method for the next time increment (block 506). If the generator has shut down prior to the last time segment ("Yes" branch of block 504), the method sets the last time segment variable equal to a value of one (block 508). The method may then determine the minimum startup cost variable associated with the time segment variable that is equal to one (block 510). The processor may use the minimized startup cost equation as previously described or a similar logic expression to determine the minimum startup cost for the current shutdown time. The method can display and/or store the value of the minimum startup cost as the cost associated with starting the generator based on the prior startup time and current shutdown time. The minimum startup cost can be used by the user or other systems and methods to optimize the operations of the generator. The second exemplary aspect 500 is completed and ends the first cycle of operation (block 512). The system may then standby for further instructions or restart operation for the next operation cycle (block 302 of FIG. 3).

Thus, systems and methods for startup cost modeling using a time counter are provided. It will be understood that the foregoing is only illustrative of the principles of the invention and that various modifications can be made by those skilled in the art without departing from the scope and spirit of the invention. Accordingly, such embodiments will be recognized as within the scope of the present invention. Persons skilled in the art will appreciate that the present invention can be practiced by other than the described embodiments, which are presented for purposes of illustration rather than of limitation and that the present invention is limited only by the claims that follow.

What is claimed is:

1. A computerized method for determining a generator startup cost modeling using a time counter for use in optimizing generator operation, said method comprising:

assigning, using a computer processor, a binary value to one or more time segment variables each associated with an increment of the time counter wherein a relationship defined by the sum of the one or more time segment variables being greater than or equal to a binary startup variable constitutes a first constraint of a model for determining generator startup cost, wherein a relationship defined by a sum of products of each binary time segment variable and time increment being less than or equal to a time-off variable constitutes a second constraint of the model, wherein the time-off variable being less than or equal to a time horizon used by the model constitutes a third constraint of the model, wherein the time-off variable indicates an amount of time that the generator is shutoff over the time horizon;

assigning, using the computer processor, a value to one or more startup costs variables associated with each of the one or more time segment variables; and determining the startup cost of a shutdown time for use in optimizing generator operation by summing, by the computer processor, the products of each time segment variable and associated startup cost variable subject to meeting said first, second and third constraints and further subject to a minimization operator, which, when executed by the computer processor, is configured to minimize generator startup cost, wherein the minimization operator comprises $\min\{S^t_1 {}^* C_1 + S^t_2 {}^* C_2 + \ldots + S^t_i {}^* C_i \ldots S^t_k {}^* C_k\}$, wherein $S^t_i$ represents a time segment variable for an ith time segment and $C_i$ represents the startup cost associated with said ith time segment, wherein i is a positive integer number.

2. The method of claim 1, wherein the binary value is selected from a one unit value and a zero unit value.

3. The method of claim 1, wherein the value assigned to the one or more startup cost variables is an increasing stepwise form of a startup cost function.

4. The method of claim 1, wherein the startup variable is assigned a one unit value when the generator starts.

5. The method of claim 1, wherein the time segment variable associated to the current increment of time counter is assigned a one unit value when the generator starts.

6. The method of claim 1, wherein the time segment variable associated with a first increment of the time counter is assigned a one unit value if the time counter is stopped prior to the first increment.

7. The method of claim 1, wherein the time segment variable associated with a last increment of the time counter is assigned a one unit value if the time counter reaches a final count.

8. A computer implemented system for determining a generator startup cost using a counter for use in optimizing generator operation, said system comprising:

a memory;

a display device;

and a processor for executing instructions that perform the steps of:

assigning a binary value to one or more time segment variables each associated with an increment of the time counter wherein a relationship defined by the sum of the one or more time segment variables being greater than or equal to a binary startup variable constitutes a first constraint of a model for determining generator startup cost, wherein a sum of products of each binary time segment variable and time increment being less than or equal to a time-off variable constitutes a second constraint of the model, wherein the time-off variable being less than or equal to a time horizon used by the model constitutes a third constraint of the model, wherein the time-off variable is indicative of time;

assigning a value to one or more startup costs variables associated with each of the one or more time segment variables; and determining the startup cost of a shutdown time for use in optimizing generator operation by summing the products of each time segment variable and associated startup cost variable subject to meeting said first, second and third constraints and further subject to a minimization operator configured to minimize generator startup cost, wherein the minimization operator comprises $\min\{S^t_1 * C_1 + S^t_2 * C_2 + \ldots + S^t_i * C_i \ldots S^t_k * C_k\}$, wherein $S^t_i$ represents a time segment variable for an ith time segment and $C_i$ represents the startup cost associated with said ith time segment, wherein i is a positive integer number, and wherein the time-off variable indicates an amount of time that the generator is shutoff over the time horizon.

9. The computer implemented system of claim 8, wherein the value assigned to the one or more startup cost variables is an increasing stepwise form of a startup cost function.

10. The computer implemented system of claim 8, wherein the time segment variable associated to the current increment of time counter is assigned a one unit value when the generator starts.

11. The computer implemented system of claim 8, wherein the time segment variable associated with a first increment of the time counter is assigned a one unit value if the time counter is stopped prior to the first increment.

12. The computer implemented system of claim 8, wherein the time segment variable associated with a last increment of the time counter is assigned a one unit value if the time counter reaches a final count.

13. A computer readable medium having computer readable instructions embedded therein, which, when executed by a computer, causes the computer to implement a method for determining a generator startup cost using a time counter for use in optimizing generator operation, comprising:

assigning a binary value to one or more time segment variables each associated with an increment of the time counter wherein a relationship defined by the sum of the one or more time segment variables is greater than or equal to a binary startup variable constitutes a first constraint of a model for determining generator startup cost, wherein a sum of products of each binary time segment variable and time increment being less than or equal to a time-off variable constitutes a second constraint of the model, wherein the time-off variable being less than or equal to a time horizon used by the model constitutes a third constraint of the model;

assigning a value to one or more startup cost variables associated with each of the one or more time segment variables; and determining the startup cost of a shutdown time for use in optimizing generator operation by summing the products of each time segment variable and associated startup cost variable subject to meeting said first, second and third constraints and further subject to a minimization operator configured to minimize generator startup cost, wherein the minimization operator comprises $\min\{S^t_1 * C_1 + S^t_2 * C_2 + \ldots + S^t_i * C_i \ldots S^t_k * C_k\}$ wherein $S^t_i$ represents a time segment variable for an ith time segment and $C_i$ represents the startup cost associated with said ith time segment, wherein i is a positive integer number, wherein the time-off variable indicates an amount of time that the generator is shutoff over the time horizon.

14. The computer readable medium of claim 13, wherein the value assigned to the one or more startup cost variables are increasing stepwise form of a startup cost function.

15. The computer readable medium of claim 13, wherein the time segment variable associated to the current increment of time counter is assigned a one unit value when the generator starts.

16. The computer readable medium of claim 13, wherein the time segment variable associated with a first increment of the time counter is assigned a one unit value if the time counter is stopped prior to the first increment.

17. The computer readable medium of claim 13, wherein the time segment variable associated with a last increment of the time counter is assigned a one unit value if the time counter reaches a final count.

* * * * *